May 27, 1924.

W. BRUNE

DEMOUNTABLE TIRE CARRYING RIM

Filed July 30, 1923

1,495,880

INVENTOR.
Will Brune,
BY
Geo. P. Kimmel
ATTORNEY.

Patented May 27, 1924.

1,495,880

UNITED STATES PATENT OFFICE.

WILL BRUNE, OF TEKAMAH, NEBRASKA.

DEMOUNTABLE TIRE-CARRYING RIM.

Application filed July 30, 1923. Serial No. 654,668.

*To all whom it may concern:*

Be it known that I, WILL BRUNE, a citizen of the United States, residing at Tekamah, in the county of Burt and State of Nebraska, have invented certain new and useful Improvements in Demountable Tire-Carrying Rims, of which the following is a specification.

This invention relates to demountable tire carrying rims for use in connection with automobile wheels, and has for its object to provide a rim of such class, in a manner as hereinafter set forth, whereby one is enabled to remove a tire from a rim without practically any effort and by its employment will enable the dispensing with the use of expensive tire removing machines now generally employed in tire shops.

A further object of the invention is to provide a tire carrying rim, in a manner as hereinafter set forth, for overcoming undue wear and tear on the casing, when detaching the rim from the tire, as well as furthermore producing a rim of great inherent strength, simplicity and durability.

A further object of the invention is to provide in a manner as hereinafter set forth a tire carrying rim of the collapsible type, and which can be quickly collapsed, when occasion so requires, for the purpose of removing the tire.

Further objects of the invention are to provide a tire carrying rim, in a manner as hereinafter set forth, and of the collapsible type, and which is simple in its construction and arrangement, strong, thoroughly efficient and convenient in its use, readily assembled, and comparatively inexpensive to manufacture.

With the foregoing and other objects in view, the invention consists of the novel construction, combination and arrangement of parts, as hereinafter more specifically described, and illustrated in the accompanying drawings, wherein is shown an embodiment of the invention, but it is to be understood that changes, variations and modifications can be resorted to, which fall within the scope of the claims hereunto appended.

In the drawings, wherein like reference characters denote corresponding parts throughout the several views:—

Figure 1:
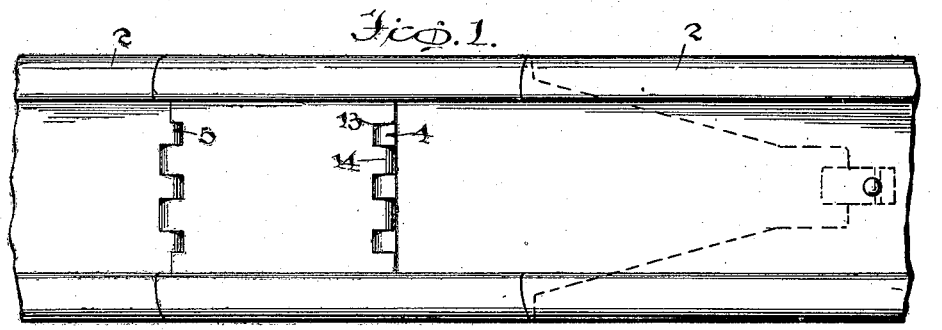
Figure 1 is a fragmentary view, in plan, of a collapsible or demountable tire carrying rim in accordance with this invention.

Referring to the drawings in detail, 1 denotes a split annulus which constitutes the body portion of the rim, and is formed of material of the desired thickness or weight and is provided with a clincher flange 2 at each side thereof, and the said flanges 2 extend from one end of the body portion 1 and terminate at a point removed from the other end of said body portion 1. That end terminal of the body portion 1 which is free of the clincher flanges 2 is indicated at 3 and is formed with a pair of barrels 4. The other end of the body portion 1, is also provided with a pair of barrels, and which are indicated at 5. The barrels 4, when the body portion is set up, extend towards the barrels 5.

Interposed between the split ends of the body portion 1, is the shiftable section of the rim, and said shiftable section is formed from a suitable casting, consisting of an offset body portion formed of two parts 6 and 7, and with the part 7 offset with respect to the part 6 and with said part 7 extending from an angularly disposed portion 8 formed at one terminus of the part 6. The part 6 is provided with a pair of clincher flanges 9 and the part 7 with a pair of clincher flanges 10 and with the flanges 10 of greater height than the flanges 9, in view of the fact that the part 7 is offset with respect to the part 6. The flanges 9 form a continuation of the flanges 2 at one end of the body portion and the flanges 10 form a continuation of the flanges 2 at the other end of the body portion 1. The free end of the part 6 is provided with a pair of barrels 11, which are adapted to extend between the barrels 5, and said barrels 11 are pivotally connected to the barrels 5 by a pivot pin 12, which extends through the alining barrels 5 and 11, and by this arrangement, the part 9 is hinged to one end of the body portion 1.

The other terminus of the part 6, is provided with a cutout portion 13, and a pair of barrels 14, which extend in an opposite direction with respect to the barrels 5, and said angularly disposed portion 8, is also cutaway as at 15, and the opening formed by said cutaway portion opens into the cutaway portion 13 of the part 6. The barrels 14 depend inwardly with respect to the part 6.

The barrels 4 carried by the end terminal 3, of the body portion 1, are extended between the barrels 14, formed on the part 6, and the said barrels 4 and 14 are pivotally connected together by a pivot pin 16, and by this arrangement both ends of the body portion 1 are hinged to the shiftable section of the rim.

Figure 2:
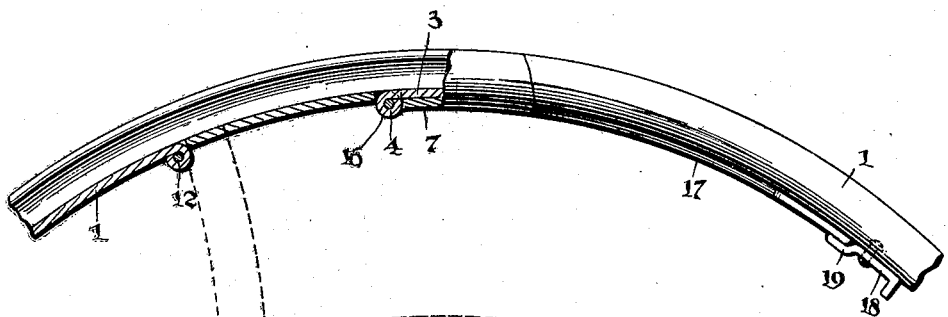
Fig. 2 is a fragmentary view, in sectional elevation, of a collapsible or demountable tire carrying rim in accordance with this invention, and illustrating in full lines the rim extended, and in dotted lines the rim collapsed.
Figure 3:
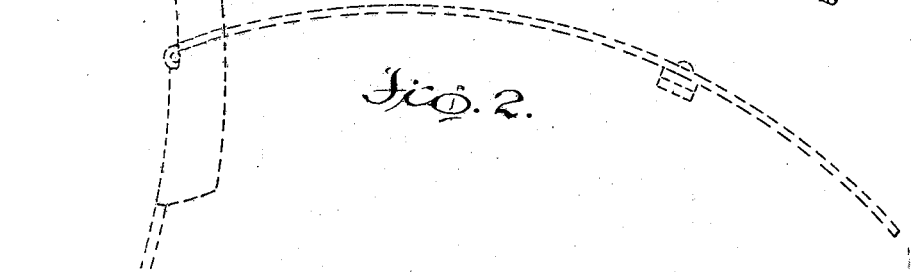
Fig. 3 is a perspective view of the shiftable hinge section of the rim.

The part 7 of the shiftable section of the rim is adapted to receive the end terminal portion 3 of the body portion 1, as shown in Fig. 2, and said part 7 is provided with a tongue 17, which projects therefrom and in a circumferential direction with respect to the rim, and is positioned against the lower face of the body portion 1, as clearly shown in Fig. 2, and also shown by dotted lines in Fig. 1. The inner face of the body portion 1, is provided with a pivoted latch 18, having an offset portion 19 adapted to overlap the free end of the tongue 17, for the purpose of locking the shiftable section of the rim from movement, so as to maintain the rim in an extended position, in the manner as shown in Fig. 2.

By shifting the latch to extend transversely with respect to the inner face of the body portion 1 so as to release the tongue 17, the shiftable section can be moved inwardly to the position as shown in dotted lines, under such conditions, collapsing the rim and permit of the ready removal of the tire. When extending the rim, the shiftable section is moved to the position shown in dotted lines in Fig. 2, and the latch 18 shifted to engage the free end of the tongue 17, whereby the shiftable section is locked in position.

Although the preferred construction or embodiment of a demountable or collapsible rim, in accordance with this invention, is as illustrated and described, yet it is to be understood that changes in the details of the construction can be had which will fall within the light of the invention as claimed.

What I claim is:

1. A collapsible rim comprising a body portion in the form of a split annulus, a shiftable rim section provided with an offset portion, means for hinging one end of said shiftable section to one of the ends of said body portion, the other end of said body portion extended onto said offset portion of said shiftable section, means for hinging the said other end of said body portion to said shiftable section in advance of said offset portion, and means for detachably connecting the free end of the offset portion of said shiftable section to the inner face of said body portion.

2. A collapsible rim comprising a body portion in the form of a split annulus, a shiftable section having one end hinged to one of the ends of said body portion, said shiftable section further extending against the inner face at the other end of said body portion, means for hinging the other end of said body portion to said shiftable section intermediate the ends thereof, and means for detachably connecting the other end of said shiftable section against the inner face of said body portion, said body portion provided with side clincher flanges, and said shiftable section provided with side clincher flanges forming continuations of the flanges of said body portion, each of the flanges of said shiftable section having one portion of greater height than the other.

3. A collapsible rim comprising a body portion in the form of a split annulus, a shiftable rim section provided with an offset portion, means for hinging one end of said shiftable section to one of the ends of said body portion, the other end of said body portion extended onto said offset portion of said shiftable section, means for hinging the said other end of said body portion to said shiftable section in advance of said offset portion, and means for detachably connecting the free end of the offset portion of said shiftable section to the inner face of said body portion, said body portion provided with side clincher flanges, and said shiftable section provided with side clincher flanges forming continuations of the flanges of said body portion, each of the flanges of said shiftable section having one portion of greater height than the other.

4. A demountable rim comprising a shiftable rim section having an angularly disposed portion intermediate its ends, extending inwardly with respect thereto and cutaway to provide an opening, said section furthermore provided intermediate its ends with an opening communicating with the opening in the angularly disposed portion, said section further including an offset part integral with said angularly disposed portion, a body portion in the form of a split annulus, means for hinging one of the ends of said body portion to one end of said shiftable section, the other end of said body portion extending onto said offset part, means for hinging the other end of said body portion at the openings in said shiftable section, and means for detachably connecting the free end of said offset portion against the inner face of said body portion thereby maintaining the rim extended.

In testimony whereof, I affix my signature hereto.

WILL BRUNE.